Figure 1:
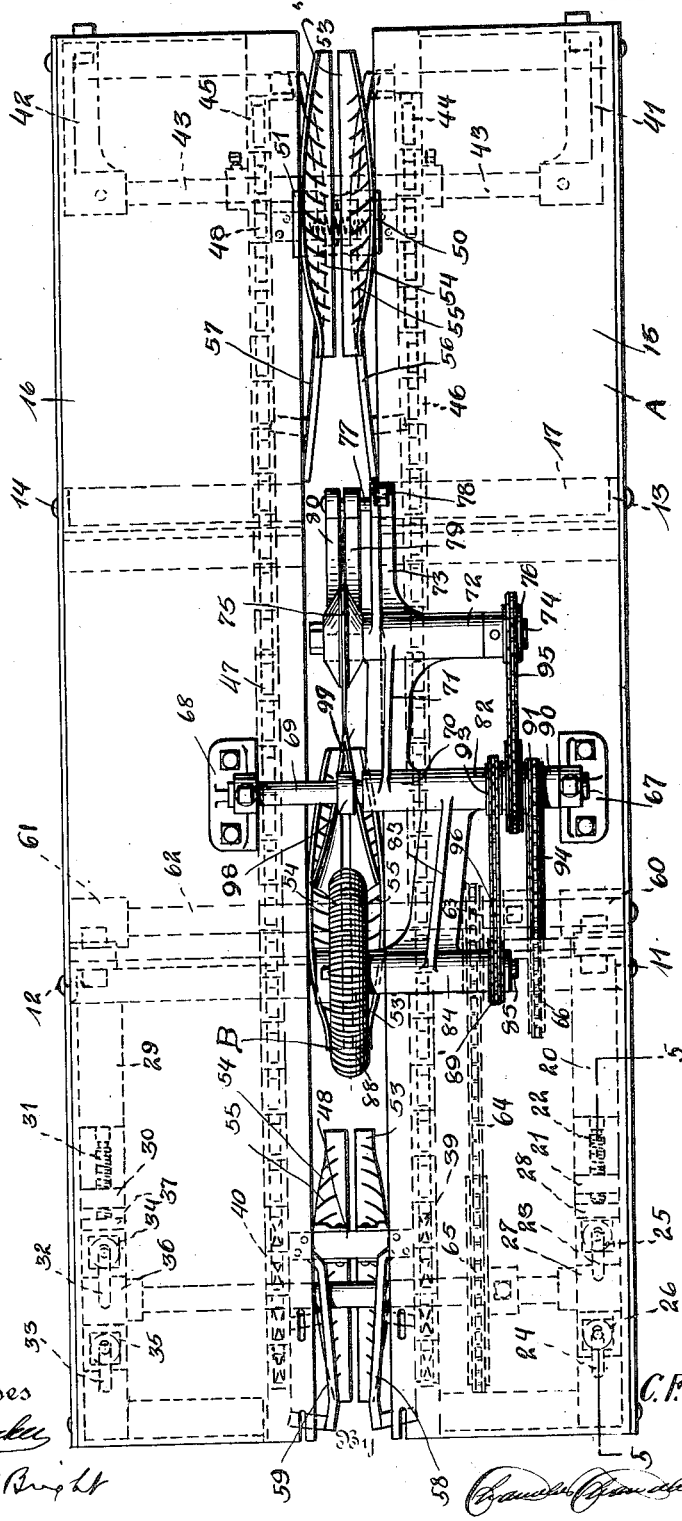

C. F. MISCHLER.
FISH CLEANING MACHINE.
APPLICATION FILED MAY 2, 1913.

1,103,809.

Patented July 14, 1914.
4 SHEETS—SHEET 1.

Witnesses

Inventor
C. F. Mischler

Attorneys

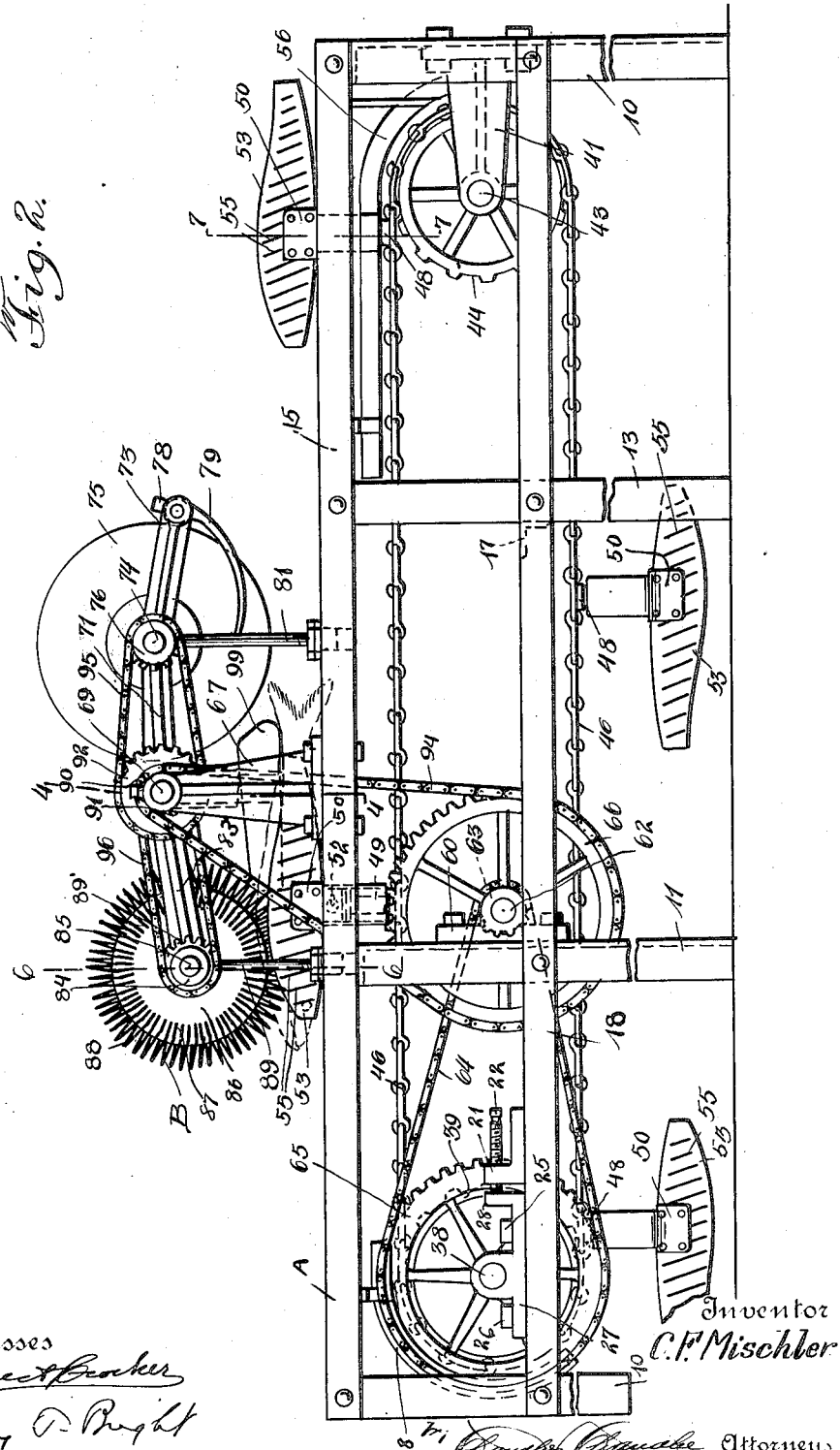

C. F. MISCHLER.
FISH CLEANING MACHINE.
APPLICATION FILED MAY 2, 1913.
1,103,809.
Patented July 14, 1914.
4 SHEETS—SHEET 3.
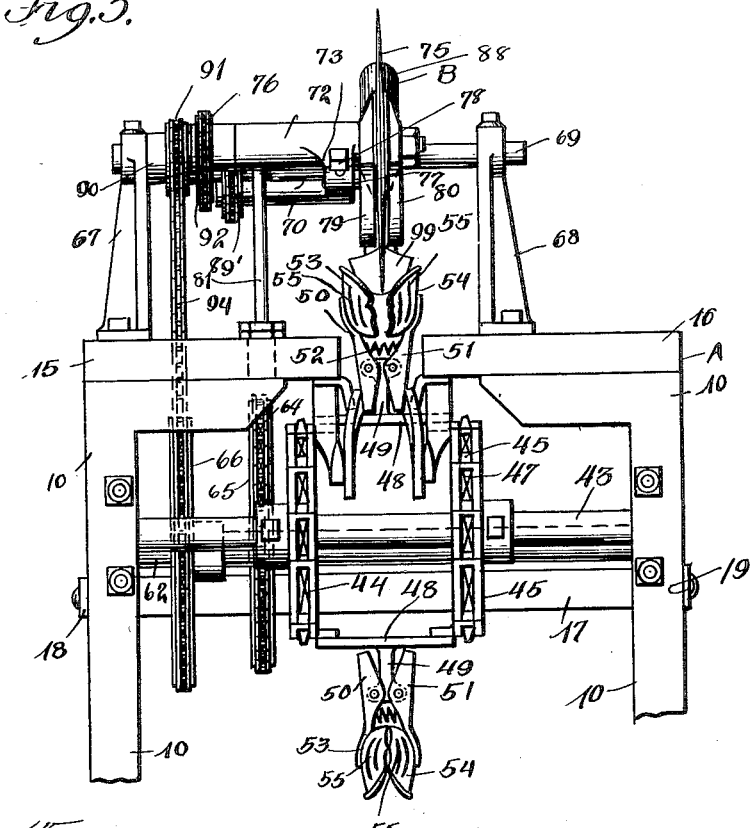
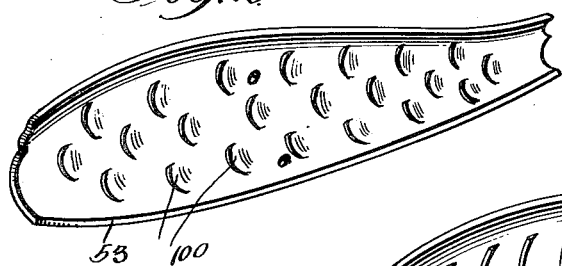
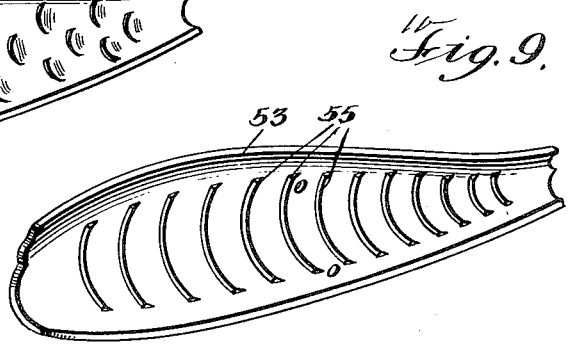
Witnesses
Inventor
C. F. Mischler.
By Chandler & Chandler
Attorneys

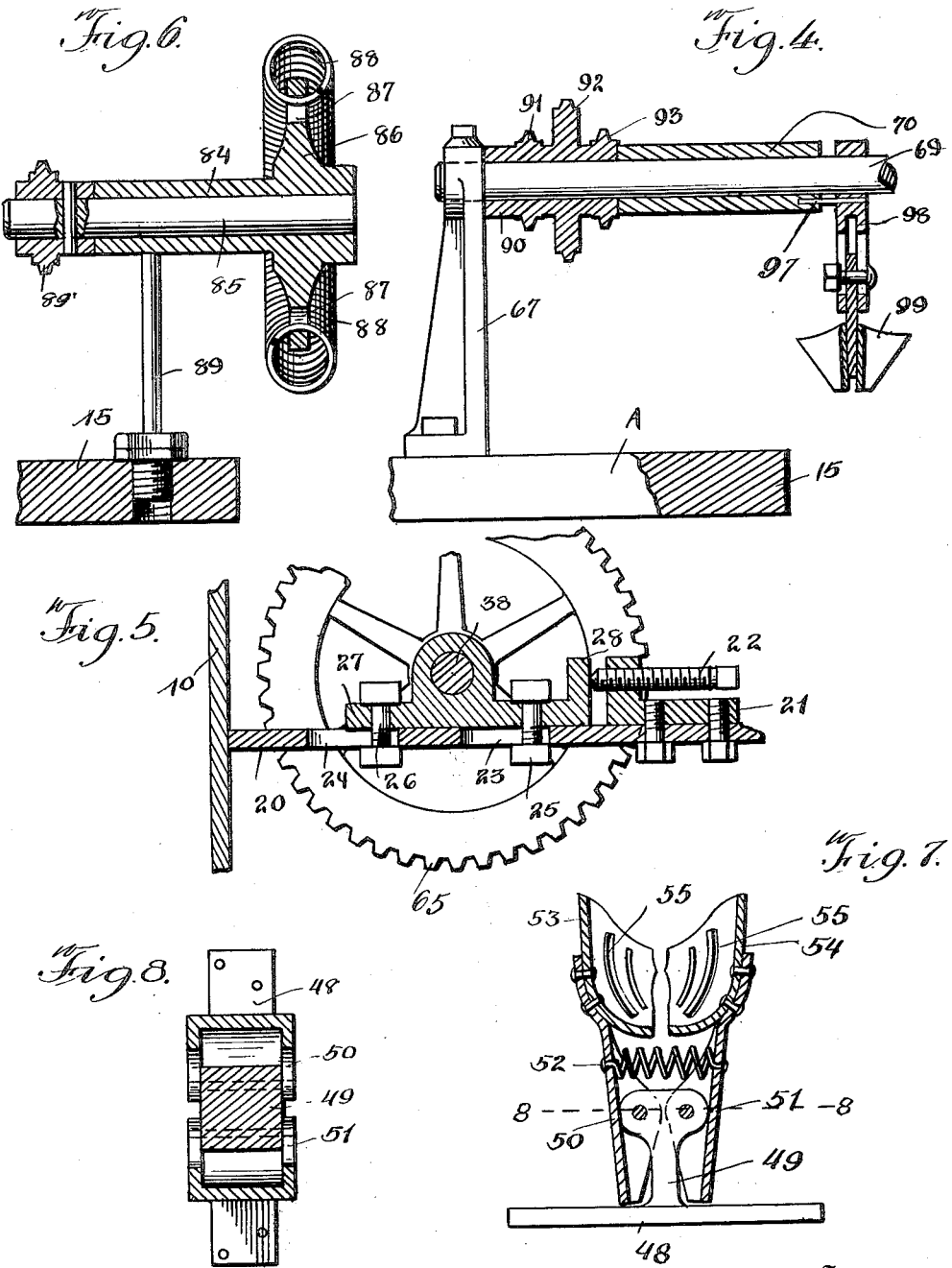

UNITED STATES PATENT OFFICE.

CHARLES F. MISCHLER, OF SANDUSKY, OHIO.

FISH-CLEANING MACHINE.

1,103,809.  Specification of Letters Patent.  Patented July 14, 1914.

Application filed May 2, 1913. Serial No. 765,141.

*To all whom it may concern:*

Be it known that I, CHARLES F. MISCHLER, a citizen of the United States, residing at Sandusky, in the county of Erie, State of Ohio, have invented certain new and useful Improvements in Fish-Cleaning Machines; and I do hereby declare the following to be a full, clear, and exact description of the invention, such as will enable other skilled in the art to which it appertains to make and use the same.

This invention relates to fish cleaning machines.

The object of the invention resides in the provision of a fish cleaning machine which obviates the necessity of partly dressing the fish by cutting off the heads and tails before feeding same to the machine for the purpose of cleaning.

A further object of the invention resides in the provision of a fish cleaning machine which embodies improved means for insuring a given depth of cut into the fish irrespective of its size, improved means for automatically adjusting the cleaning mechanism to the particular size of fish being operated upon, and other improved mechanism as will hereinafter appear.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a fish cleaning machine constructed in accordance with the invention; Fig. 2, a side elevation of same; Fig. 3, an end view of the machine; Fig. 4, a section on the line 4—4 of Fig. 2; Fig. 5, a section on the line 5—5 of Fig. 1; Fig. 6, a section on the line 6—6 of Fig. 2; Fig. 7, a section on the line 7—7 of Fig. 2; Fig. 8, a section on the line 8—8 of Fig. 7; Fig. 9, a perspective view of one of the holding jaws of the carrier, and Fig. 10, a perspective of a modified form of holding jaw.

Referring to the drawings the machine is shown as comprising a table like body A which includes corner legs 10 and intermediate side legs arranged in corresponding pairs 11—12 and 13—14. Supported upon these legs is a top formed of independent sections 15 and 16 having their adjacent longitudinal edges disposed in parallel spaced relation. The legs 13 and 14 are connected by a cross member 17 so as to hold the top sections 15 and 16 against relative movement. The side legs 11 and 13 and the corner legs 10 on the same side of the machine are connected together by a longitudinal beam 18. Likewise the side legs 12 and 14 and the corner legs 10 on the same side of the machine are connected together by a longitudinal beam 19. The beam 18 between the side leg 11 and the adjacent corner leg 10 is provided with an inwardly directed flange 20 to which is secured an upstanding block 21 having mounted therein an adjusting screw 22 for a purpose that will presently appear. Formed in the flange 20 are longitudinal slots 23 and 24 through which are engaged bolts 25 and 26 respectively which pass through a bearing 27 seated upon the flange 20, said bearing having an upturned end 28 for coöperation with the adjusting screw 22. The beam 19 between the side leg 13 and the adjacent corner leg 10 is provided with an inwardly directed flange 29 upon which is mounted a block 30 carrying an adjusting screw 31 disposed longitudinally of the machine. The flange 29 between the block 30 and the adjacent corner leg 10 is provided with longitudinal slots 32 and 33 through which are engaged bolts 34 and 35 respectively, said bolts passing through a bearing 36 seated upon the flange 29 and provided with an upturned end 37 adapted for coöperation with the adjusting screw 31. Journaled in the bearings 27 and 36 is a shaft 38.

Fixed on the shaft 38 beneath the top section 15 is a sprocket wheel 39, while a corresponding sprocket wheel 40 is fixed on the shaft 38 beneath the top section 16. Secured to the corner leg 10 remote from the shaft 38 are inwardly directed brackets 41 and 42 in which is journaled a shaft 43 disposed at exactly the same elevation as the shaft 38. Fixed on the shaft 43 beneath the top section 15 and in line with the sprocket wheel 39 is a sprocket wheel 44, while a corresponding sprocket wheel 45 is fixed on the shaft 43 beneath the top section 16 and in line with the sprocket wheel 40. Traveling on the sprocket wheels 39 and 44 is a sprocket chain 46 while another sprocket chain 47 travels on the sprocket wheels 40 and 45. Connecting the sprocket chains 46 and 47 at spaced intervals are plates 48 on each of which is formed an outwardly projecting arm 49. Pivotally mounted on each arm 49 for movement transversely of the machine are levers 50 and 51 the upper ends of which are drawn toward each other by a tension spring 52 having its terminals connected to said levers respectively. The levers 50 and 51 carry at their upper ends coöperating jaws 53 and 54 respectively which are formed of sheet metal and shaped so as to conform substantially to the shape of the sides of the fish. Struck from these jaws 53 and 54 are inwardly directed tongues 55 which are adapted to engage the body of the fish when the jaws are clamped thereon so as to prevent sliding of the fish in the jaws during operation of the cutting and cleaning mechanism thereon.

Suitably suspended from the top sections 15 and 16 at the end of the machine adjacent the shaft 43 are curved rails 56 and 57, said rails projecting beyond the inner edges of respective top sections. These rails 56 and 57 are adapted to coöperate with the inner ends of the levers 50 and 51 during movement of the chains 46 and 47 so as to force said inner ends of the levers toward each other and thus open the jaws 53 and 54 to permit a fish being fed therebetween. As soon as the levers 50 and 51 pass beyond the point where the rails 56 and 57 are nearest together the spring 52 will act to close the jaws 53 and 54 upon the fish and thus secure and hold same in position to be operated upon by the cutting and cleaning mechanism of the machine. Suitably supported from the top members 15 and 16 at the end of the machine adjacent the shaft 38 are curved rails 58 and 59 respectively which are adapted to engage the lower ends of the levers 50 and 51 after the fish has been operated upon by the cutting and cleaning mechanism and force the lower ends of said levers together. This coöpeartion between the rails 58 and 59 and the levers 50 and 51 will take place just before the return movement of said levers and associated parts so that the jaws 53 and 54 will be opened to discharge the fish already cleaned just before said levers and jaws begin to partake of their return movement. The parts so far described constitute the fish conveying mechanism of the machine and it will be apparent that owing to the adjustable mounting of the bearings 27 and 36 the chains 46 and 47 can always be maintained in the desired taut condition to maintain said mechanism at its highest efficiency.

Mounted on the side legs 11 and 12 are bearings 60 and 61 respectively in which is journaled a shaft 62 adapted to be rotated from any suitable source of power. Fixed upon the shaft 62 is a sprocket wheel 63 which is operatively connected by a sprocket chain 64 with a sprocket wheel 65 fixed on the shaft 38 and whereby the rotation of the shaft 62 is imparted to the shaft 38. Also fixed on the shaft 62 is a sprocket wheel 66 for a purpose that will presently appear.

Mounted on the top sections 15 and 16 are upstanding brackets 67 and 68 respectively in which is mounted the terminals of a rod 69. Rotatably mounted on the rod 69 is a sleeve 70 provided with a radial arm 71 extending toward the shaft 43. This arm 71 terminates in a bearing 72 disposed transversely of the machine and this bearing 72 is provided with a radial arm 73 disposed at an angle to the arm 71. Journaled in the bearing 72 is a shaft 74 one end of which has fixed therein a circular knife 75 disposed centrally of the machine while the other end thereof has fixed thereon a sprocket wheel 76. The free end of the arm 73 has rotatably mounted therein a rod 77 which is adapted to be locked against rotation by a set screw 78 mounted in the free end of the arm 73. Fixed on the rod 77 are corresponding fingers 79 and 80 which are disposed on opposite sides of the knife 75 respectively. These fingers 79 and 80 serve the function of insuring a given depth of cut by the knife 75 and said fingers can be adjusted by rotating the rod 77 after releasing the set screw 78 it being apparent that the knife 75 can be thus controlled to operate efficiently on different sizes of fish. The downward movement of the arm 71, bearing 72 and arm 73 under the influence of gravity is limited by a stop screw 81 mounted for vertical adjustment in the top section 15 and engaging at its upper end the under side of the bearing 72. Rotatably mounted on the shaft 69 is a sleeve 82 provided with an arm 83 extending toward the shaft 38. The free end of the arm 83 terminates in a bearing 84 disposed transversely of the machine and journaled in this bearing is a shaft 85. Fixed on the shaft 85 in line with the knife 75 is a cleaning wheel B which includes a disk 86 provided adjacent its peripheral edge with a plurality of radial slots 87 and in which is successively laced the ribbon of an endless coil 88. The downward movement of the arm 83 and bearing 84 is limited by a stop screw 89 mounted for vertical adjustment in the top section 15 and engaging at its upper end the under side of the bearing 84. Mounted on the end of the shaft 85 remote from the cleaning wheel B is a sprocket wheel 89' for a purpose that will presently appear. Rotatably mounted on the rod 69 between the sleeve 82 and the bracket 67 is a sleeve 90 which has fixed thereon sprocket wheels 91, 92 and 93. The sprocket wheel 91 alines with the sprocket wheel 66 and is operatively connected to the latter by means of a sprocket chain 94. The sprocket wheel 92 alines with the sprocket wheel 76 and is operatively connected therewith by means of a sprocket chain 95. The sprocket wheel 93 alines with the sprocket wheel 89' and is operatively connected to said sprocket wheel by means of a sprocket chain 96. By this construction it will be apparent that when the shaft 62 is rotated such rotation will be imparted to the knife 75 and the cleaning wheel B.

Rotatably mounted upon the rod 69 is an arm 98 which adjustably supports at its lower end a V-shaped spreader 99 disposed in line with the cleaning wheel B and knife 75 and having its minor end directed toward said knife. The arm 98 is connected to the sleeve 70 by means of a pin 97. It will be noted that by reason of the pin connection between the arm 98 and sleeve 70 any adjustment of the knife 75 will produce a corresponding adjustment of the spreader 99.

Instead of the jaws 53 and 54 being provided with struck up tongues extending substantially all the way across the jaws the same may be constructed with a plurality of relatively short staggered tongues 100 as clearly shown in Fig. 10.

In the operation of the machine the rotation of the shaft 62 is instituted by means of suitable connections with a source of power and this rotation of said shaft 62 will in turn simultaneously operate the various parts of the machine by reason of the connections heretofore described. As the levers 50 and 51 start to move toward the knife 75 the jaws 53 and 54 will be moved to open position by the rails 56 and 57 at which time the fish it is desired to clean is placed between the jaws. As the levers 50 and 51 move toward the knife 75 said levers pass out of engagement with the rails 56 and 57 and the jaws 53 and 54 are released to closed position and thus securely hold the fish therebetween. The fish is then carried into contact with the rotating knife 75 which makes the incision, the fingers 79 and 80 limiting the depth of the cut. The fish will then be carried beyond the knife 75 and the spreader 99 will enter the incision and widen same to receive the coils of the cleaning wheel B. As the fish moves beneath the cleaning wheel the rotation of the latter will remove all entrails, the resiliency of the coil enabling same to closely apply itself within the fish and rendering it impossible for the fish to be torn in the cleaning operation. After the fish has been acted upon by the cleaning wheel it is moved on until the levers 50 and 51 are operated upon by the rails 58 and 59 said rails spreading the jaws 53 and 54 just as the levers and jaws turns to partake of their return movement and thus discharging the clean fish into a suitable receptacle at the end of the machine. This operation is repeated for each fish to be cleaned.

What I claim is:—

1. In a fish cleaning machine, the combination of a supporting frame and a fish conveyer mounted on said frame, a transverse rod mounted on the frame above the conveyer, an arm pivotally mounted on said rod, a circular knife mounted on said arm in the plane of the conveyer, a pair of cut regulating fingers pivotally mounted on said arm and disposed on opposite sides of the knife respectively, means for pivotally adjusting said cut regulating fingers to vary the depth of cut, adjustable means for limiting the downward movement of said arm under the influence of gravity, a cleaning wheel rotatably mounted on said frame in the plane of said circular knife, and a spreader mounted on the frame between the cleaning wheel and knife.

2. In a fish cleaning machine, the combination of a supporting frame, and a fish conveyer on said frame, a swinging arm mounted on the frame above the conveyer, a circular knife rotatably mounted on said arm intermediate the ends of the latter and in the plane of the conveyer, a pair of cut regulating fingers pivotally supported upon the outer end of said arm at a point forward of the advance edge of the knife and disposed on opposite sides of the knife respectively said fingers having their free ends directed toward the inner end of the arm, and means for pivotally adjusting said cut regulating fingers to vary the depth of the cut.

3. A cleaning wheel for fish cleaning machines comprising a disk having a plurality of radial slots adjacent its peripheral edge and an endless coil having its ribbon laced through said slots and surrounding the periphery of the disk said slots being of a depth to permit movement of the coil radially of the disk.

In testimony whereof, I affix my signature, in the presence of two witnesses.

CHARLES F. MISCHLER.

Witnesses:
 JAMES M. FRENCH,
 JOSEPH HOBERT, Jr.